No. 629,791. Patented Aug. 1, 1899.
J. A. KIESELE.
CANDLE HOLDER.
(Application filed Jan. 14, 1899.)
(No Model.) 2 Sheets—Sheet 1.
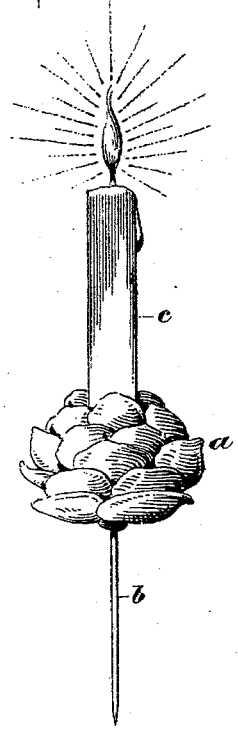
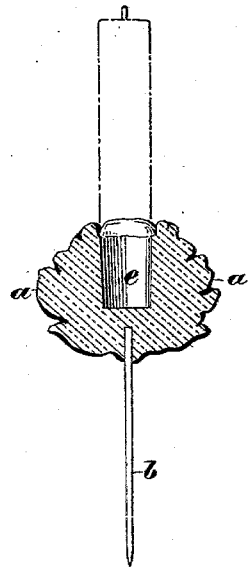
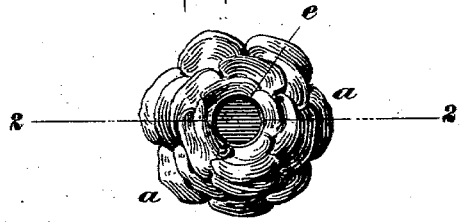
WITNESSES:
INVENTOR
John A. Kiesele
BY
ATTORNEYS

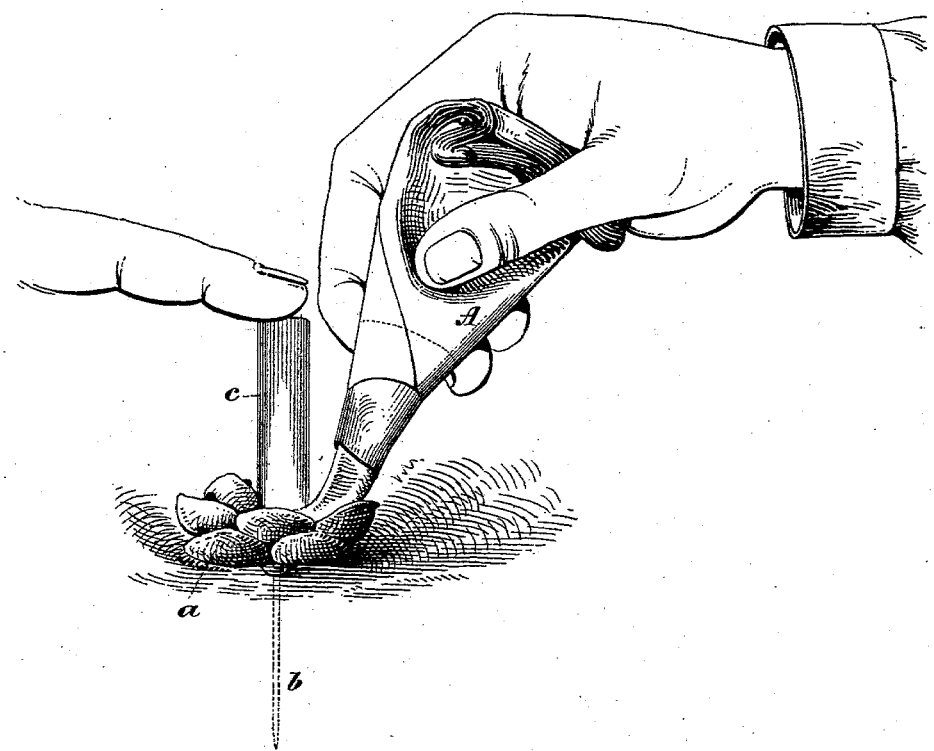

UNITED STATES PATENT OFFICE.

JOHN A. KIESELE, OF NEWARK, NEW JERSEY.

CANDLE-HOLDER.

SPECIFICATION forming part of Letters Patent No. 629,791, dated August 1, 1899.

Application filed January 14, 1899. Serial No. 702,126. (No model.)

*To all whom it may concern:*

Be it known that I, JOHN A. KIESELE, a citizen of the United States, residing in Newark, Essex county, State of New Jersey, have invented certain new and useful Improvements in Candle-Holders, of which the following is a specification.

My invention relates to candle-holders especially adapted to hold Christmas-tree candles and candles upon cakes—birthday-cakes, for instance; and it consists in the novel article of manufacture hereinafter set forth and claimed.

Heretofore candlesticks and holders for Christmas-tree candles have been, so far as I am aware, usually made in a cheap manner from sheet metal, and I have found them to be both unsightly and ineffective.

By my invention I produce a candle-holder which is both ornamental and effective and which may be used for a great variety of purposes.

My invention will be understood by referring to the accompanying drawings, showing a candle-holder embodying my invention and illustrating the preferred mode of manufacturing the same.

In the drawings, Figure 1 is a side elevation or view of a candle-holder embodying my invention, the said candle-holder being shown as supporting a candle. Fig. 2 is a transverse section through the candle-holder shown in Fig. 1; and Fig. 3 is a plan view thereof, showing the line 2 2 upon which the section Fig. 2 is taken. Fig. 4 is a view showing the candle-holder in process of construction, exhibiting the use of a confectioner's tube for forming the said candle-holder.

In the drawings, *a* represents the body of the candle-holder, which is shown in the present instance in the form of a rose, although other ornamental forms may be employed.

The candle-holder may be provided with a tack or other attaching device *b*, secured to the body of the candle-holder, preferably by being embedded therein.

The candle-holder is composed of a freely-flowing, self-hardening, homogeneous, plastic material, the parts of the candle-holder, although separately applied, as will be explained, flowing together, so as to constitute an entire structure of a uniform texture or character.

In making the candle-holder I preferably proceed as follows: I take an ordinary confectioner's tube A, containing a suitable freely-flowing, self-hardening, homogeneous, plastic material—such, for instance, as an icing composed of powdered sugar and white of egg—and form the ornamental base or body *a* around a mandrel *c* of the size and shape of the base of the candle. This mandrel, however, may be the candle itself. As the candle-holder is built up in successive layers by the confectioner's tube it will be observed that the parts of the layers which come in contact with each other adhere, so as to form substantially an integral structure containing a socket *e*, which structure, where the layers come into contact with each other, is uniform and homogeneous. These layers are shown in the drawings as the petals of the flower, the lower portions of which petals unite with each other to form the homogeneous integral structure mentioned, and the upper portions of the said petals or layers extend outward free from contact with each other.

Having described my invention, what I claim, and desire to secure by Letters Patent, is—

As a new article of manufacture, a candle-holder consisting of a base of freely-flowing, self-hardening homogeneous plastic material secured together in layers, the portions of the layers which are in contact with each other flowing or uniting together to form an integral structure and other portions of the layers projecting from such integral structure free from contact with adjacent or contiguous layers.

JOHN A. KIESELE.

Witnesses:
  MAURICE BLOCK,
  GEO. E. MORSE.